United States Patent
Heaton

(10) Patent No.: US 7,813,977 B2
(45) Date of Patent: Oct. 12, 2010

(54) GRAPHICAL USER INTERFACE RELATED TO NON-STANDARD TRADING OF FINANCIAL INSTRUMENTS

(75) Inventor: Timothy H Heaton, Morristown, NJ (US)

(73) Assignee: BGC Partners, Inc., New York, NY (US)

( * ) Notice: Subject to any disclaimer, the term of this patent is extended or adjusted under 35 U.S.C. 154(b) by 1740 days.

(21) Appl. No.: 10/661,763

(22) Filed: Sep. 11, 2003

(65) Prior Publication Data

US 2005/0060255 A1   Mar. 17, 2005

(51) Int. Cl.
G06Q 40/00 (2006.01)

(52) U.S. Cl. ...................................................... 705/35
(58) Field of Classification Search .................... 705/35
See application file for complete search history.

(56) References Cited

U.S. PATENT DOCUMENTS

| | | | |
|---|---|---|---|
| 6,016,482 A | 1/2000 | Molinari et al. | 705/35 |
| 6,134,535 A | 10/2000 | Belzberg | 705/37 |
| 6,304,858 B1* | 10/2001 | Mosler et al. | 705/37 |
| 6,343,278 B1* | 1/2002 | Jain et al. | 705/36 R |
| 6,996,540 B1* | 2/2006 | May | 705/37 |
| 7,124,108 B1* | 10/2006 | Kimle et al. | 705/37 |
| 7,200,572 B2* | 4/2007 | Beurskens | 705/37 |
| 7,313,539 B1* | 12/2007 | Pappas et al. | 705/35 |
| 2001/0034687 A1* | 10/2001 | Bushonville et al. | 705/37 |
| 2001/0037284 A1* | 11/2001 | Finkelstein et al. | 705/37 |
| 2001/0038284 A1* | 11/2001 | Hahn | 324/307 |
| 2002/0091625 A1* | 7/2002 | Blauvelt et al. | 705/37 |
| 2002/0120546 A1 | 8/2002 | Zajac | 705/37 |
| 2002/0178104 A1* | 11/2002 | Hausman | 705/37 |
| 2003/0074300 A1* | 4/2003 | Norris | 705/37 |
| 2004/0030638 A1* | 2/2004 | Dwin | 705/38 |
| 2004/0133494 A1* | 7/2004 | Jones et al. | 705/35 |
| 2004/0199459 A1* | 10/2004 | Johnston et al. | 705/38 |
| 2004/0249742 A1* | 12/2004 | Laurent et al. | 705/37 |
| 2004/0267657 A1* | 12/2004 | Hecht | 705/37 |
| 2005/0044026 A1* | 2/2005 | Leistner | 705/35 |
| 2006/0080216 A1* | 4/2006 | Hausman et al. | 705/37 |
| 2006/0218069 A1* | 9/2006 | Aberman et al. | 705/37 |

OTHER PUBLICATIONS

Lumpkin, S; Repurchase and Reverse Repurchase Agreements, Ferderal Reserve Bank of Richmond, Economic Review, Jan./Feb. 1987, pp. 15-23.*

Bertocchi et al.: Bond portfolio management with repo contracts: Italian case, 2000, Annals of Operations Research 97 (2000) pp. 111-129.*

Shapiro, A: Foundations of Finance—Lecture Notes 16 Forward and Futures, Fall 1993, pp. 1-15.*

* cited by examiner

*Primary Examiner*—Hani Kazimi
*Assistant Examiner*—Bijendra K Shrestha
(74) *Attorney, Agent, or Firm*—Glen R. Farbanish

(57) ABSTRACT

A graphical user interface related to non-standard settlement trading in financial instruments is provided. The graphical user interface preferably includes a selectable portion of a display screen related to a financial instrument and a selectable tab for accessing a selectable portion of the display screen related to one or a plurality of non-standard settlement positions with respect to the financial instrument. In one embodiment of the invention, when the tab is selected, access is provided to the selectable portion of the display screen related to the plurality of non-standard settlement positions.

16 Claims, 6 Drawing Sheets

| Instrument and Settlement Date | Price/Volume | |
|---|---|---|
| usg_10Y (United States Government 10-Year Bond) | 97.10/97.10+ | 5x7 |
| Settle in the cash (Cash Market) | 97.102/97.106 | 5x7 |
| Settle at r+1 | 97.096/97.102 | 5x7 |
| Settle at r+2 | 97.09+/97.10 | 5x7 |
| Settle at r+3 | 97.092/97.096 | 5x7 |
| Settle at r+4 | 97.09/97.09+ | 5x7 |
| Settle at r+5 | 97.086/97.092 | 5x7 |
| Settle at r+6 | 97.08+/97.09 | 5x7 |
| Settle at 30 | 97.082/97.086 | 5x7 |
| Settle at 60 | 97.08/97.08+ | 5x7 |
| Settle at 90 | 97.078/97.082 | 5x7 |

FIG. 4

| Instrument and Settlement Date | Price/Volume | |
|---|---|---|
| usg_10Y (United States Government 10-Year Bond) | 97.10/97.10+ | 5x7 |
| Settle in the cash (Cash Market) | 97.102/97.106 | 5x7 |

510

"CLICK TO DROP"

| Instrument and Settlement Date | Price/Volume | |
|---|---|---|
| usg_10Y (United States Government 10-Year Bond) | 97.10/97.10+ | 5x7 |
| Settle in the cash (Cash Market) | 97.102/97.106 | 5x7 |
| Settle at r+1 | 97.096/97.102 | 5x7 |
| Settle at r+2 | 97.09+/97.10 | 5x7 |
| Settle at r+3 | 97.092/97.096 | 5x7 |
| Settle at r+4 | 97.09/97.09+ | 5x7 |
| Settle at r+5 | 97.086/97.092 | 5x7 |
| Settle at r+6 | 97.08+/97.09 | 5x7 |
| Settle at 30 | 97.082/97.086 | 5x7 |
| Settle at 60 | 97.08/97.08+ | 5x7 |
| Settle at 90 | 97.078/97.082 | 5x7 |

GRAPHICAL USER INTERFACE RELATED TO NON-STANDARD TRADING OF FINANCIAL INSTRUMENTS

BACKGROUND OF THE INVENTION

This invention relates to the trading of securities. More particularly, this invention relates to trading financial instruments for non-standard settlement. Such non-standard settlement (for United States Treasuries, the standard settlement is next day) may be immediate—i.e., in the cash market for immediate settlement—or forward settlement—i.e., further into the future than the next day.

One type of such a non-standard settlement is forward contract. A forward contract for a purchase or sale greater than one day into the future is a transaction in which a seller agrees to deliver a specific commodity or instrument to a buyer at some non-standard time in the future. Unlike futures contracts (which may occur through a clearing firm), forward contracts are typically privately negotiated and are not standardized. Consequently, the two parties to the forward contract must bear each other's credit risk. This is not the case with a futures contract. Also, because the contracts are not exchange traded, there is no marking to market requirement, which may allow a buyer to avoid almost all capital outflow initially (though some counterparties might set collateral requirements). Given the lack of standardization in these contracts, there is generally no secondary market in forwards.

The forward price is typically adjusted such that the forward contract has no intrinsic value when the contract is written. However, if the value of the underlying commodity or instrument changes, the value of the forward contract becomes positive or negative, depending on the position held.

Forwards are priced similarly to futures contracts. Like in the case of a futures contract, the first step in pricing a forward is to add the spot price to the cost of carry. The cost of carry may include interest forgone on the underlying instrument (a positive carry), storage costs (a negative carry) or other suitable costs. The constant accruing of income associated with interest-rate related instruments is one form of carry related to engaging in a forward sale of the interest-rate related instruments. Interest-rate related instruments typically include fixed-income securities such as United States Treasury Bills, Notes, and Bonds, or variable interest-rate instruments such as inflation-based bonds.

For example, when an investor agrees to sell an interest-rate related instrument at a pre-determined time in the future—e.g., in a month's time—then the value of the interest-rate related security necessarily declines during the month because a portion of the constant accruing associated with the instrument (that forms a part of the value of the instrument at the time of the agreement to the contract) is not part of the final transaction. Therefore, a price associated with selling a forward contract for interest-rate related instrument typically decreases as the period for the forward contract increases and creates a positive carry environment.

Unlike a futures contract, however, the price of a forward contract may also include a premium for counterparty credit risk, and the fact that there is not a daily marking to market process to minimize default risk. If no allowance is made for these credit risks, then the forward price will equal the futures price.

One particular position in a forward agreement is selling in a forward contract. Selling in a forward contract, also known as a short forward position, is the agreement to sell securities, or any other suitable financial instrument, at a pre-determined time in the future. The seller may or may not own the item or items specified in the forward contract at the time of agreeing to the forward contract.

Another position in a typical forward agreement to purchase securities at a pre-determined time in the future is known as a long forward position. In a long forward position, the investor agrees to purchase one or many securities at the present price at some point in the future with the hopes of the security increasing in value before the execution of the forward contract.

As described above, in a short position, the investor agrees to sell one security or many securities at the present (or otherwise agreed upon) price, in the hopes that the security will decline in value so that the investor can purchase the security later at a lower price, thereby "covering" his short forward position. Thus, the investor can make money on a short sale if the price of the security drops subsequent to the investor initially agreeing to sell the security at the present price at some time in the future.

The manner by which an investor would sell a security short at some time in the future is to own the security at the delivery date (either by buying it or borrowing it) and then sell the borrowed security from his own account. The only caveat to this process is that the investor may be required to put up a certain amount of margin—a portion of the total amount at risk—to assure the sale. The margin requirement ensures that any short forward sale is associated with a certain amount of leverage.

In view of the foregoing, it would be desirable to provide systems and methods for providing a graphical user interface that allows a user to quickly and easily participate—e.g., buy and/or sell—in a non-standard settlement market for financial instruments.

SUMMARY OF THE INVENTION

In is an object of the invention to provide systems and methods for providing a graphical user interface that allows a user to quickly and easily participate in a non-standard settlement market for financial instruments.

In one embodiment of the invention, a graphical user interface is defined. The interface preferably includes a selectable portion of a display screen related to a financial instrument, a selectable tab for accessing a selectable portion of the display screen related to a non-standard settlement position with respect to the financial instrument. When the tab is selected, access is provided to the selectable portion of the display screen related to non-standard settlement position.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 4 is a graphical user interface according to the invention;

FIG. 5 is another graphical user interface according to the invention; and

DETAILED DESCRIPTION OF THE INVENTION

The invention provides apparatus and methods relating to a graphical user interface that allows a user to quickly and easily sell an interest-rate related instrument, or other suitable financial instrument, for non-standard settlement. The invention further allows a user to sell an interest-rate related security for non-standard settlement by taking advantage of liquidity in the market for a cash equivalent of the future instrument.

Figure 1:
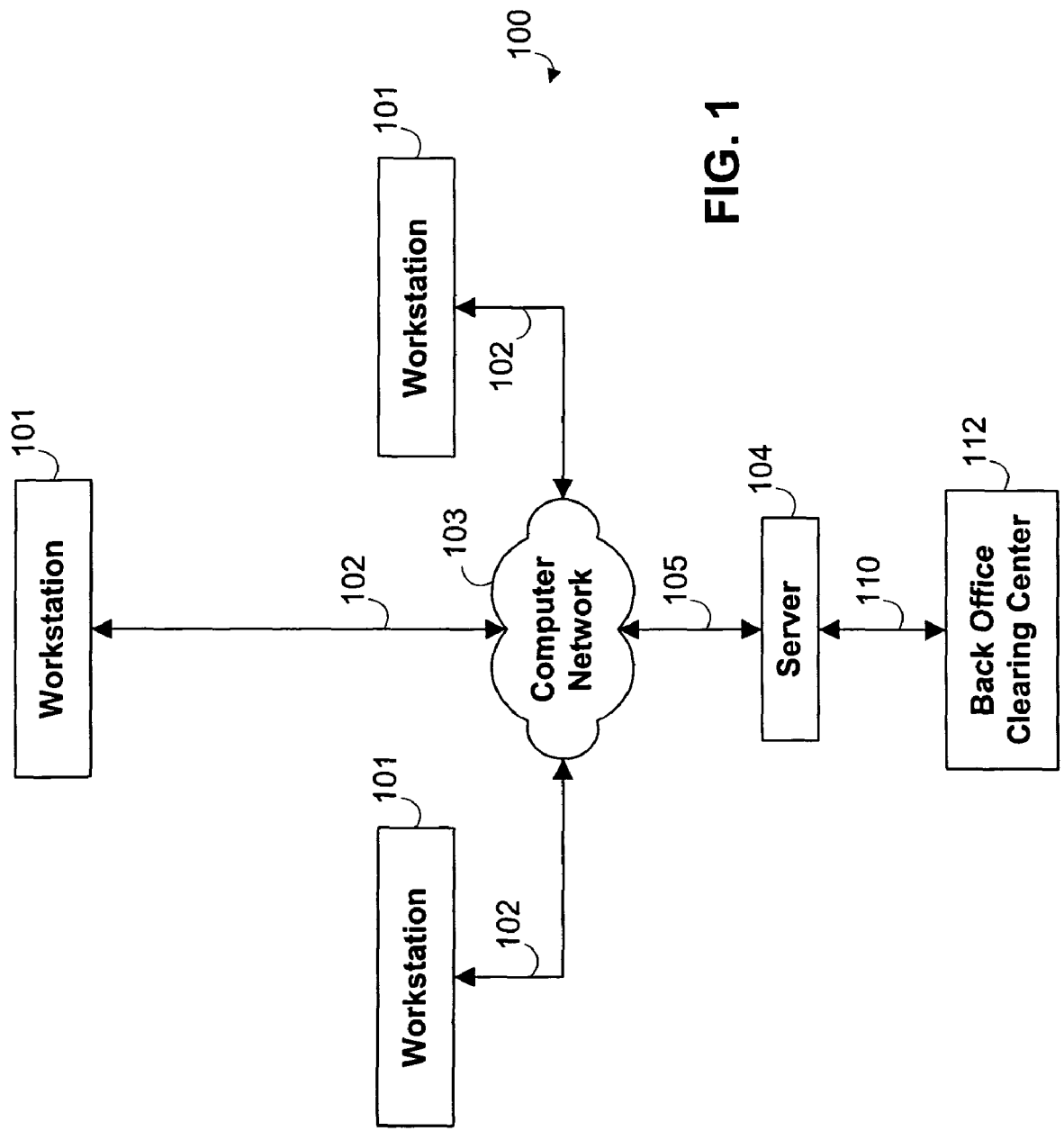
FIG. 1 is a block diagram of elements of an illustrative system in accordance with the principles of the invention.

Referring to FIG. 1, exemplary system 100 for implementing the present invention is shown. As illustrated, system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, data processing device, or combination of the same. Server 104 may be used to process and settle the executed trades.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 101 may be used to enter into and proceed with the trades that relate to the present invention, and display a graphical user interface to users of system 100 as will be described in more detail below.

Back office clearing center 112 may be any suitable equipment, such as a computer, a laptop computer, a mainframe computer, etc., or any combination of the same, for causing trades to be cleared and/or verifying that trades are cleared. Communications link 110 may be any communications links suitable for communicating data between server 104 and back office clearing center 112, such as network links, dial-up links, wireless links, hard-wired links, etc.

Figure 2:
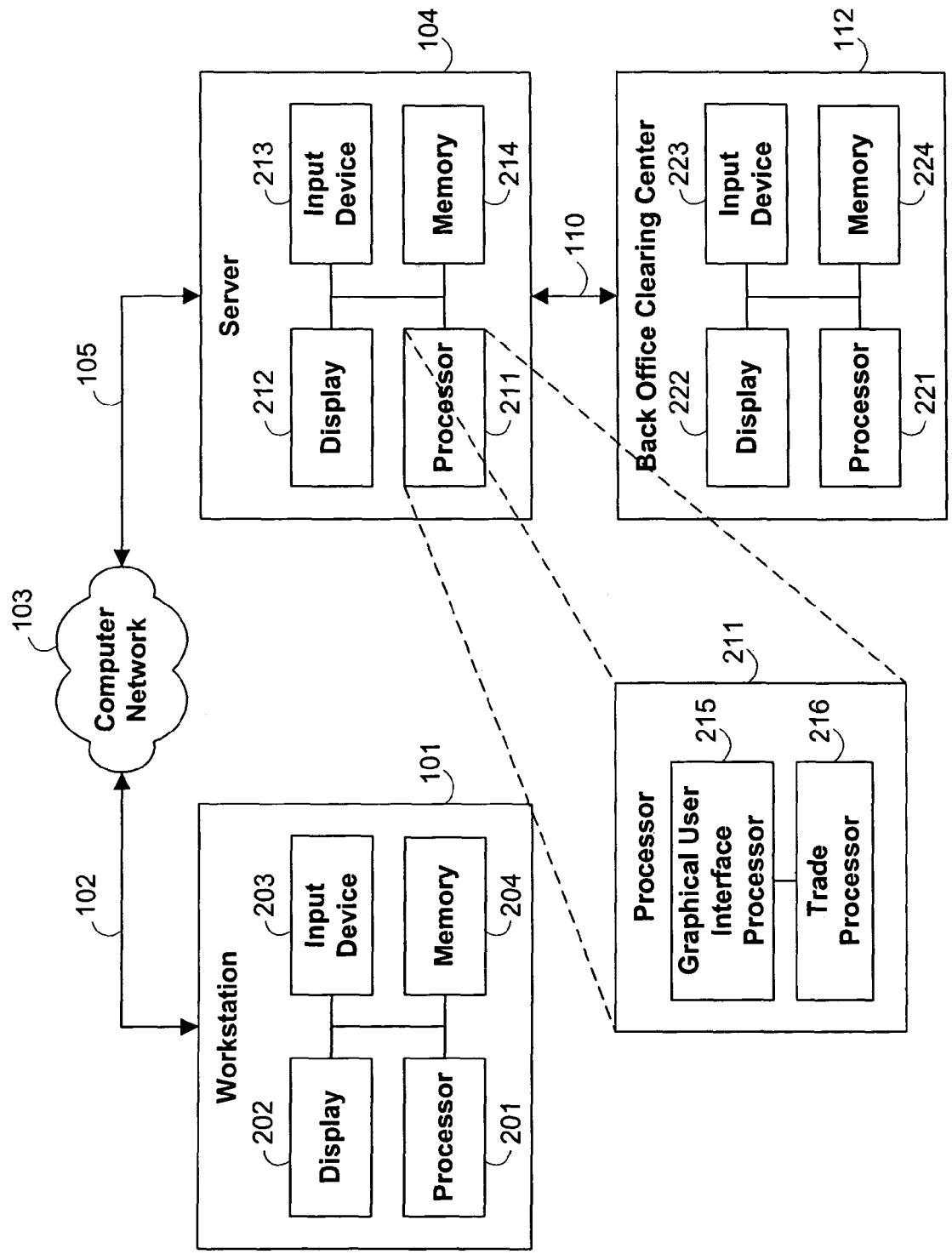
FIG. 2 is a block diagram of a workstation and a server that may be used to implement the processes and functions of certain embodiments of the present invention.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. Processor 201 may use the workstation program to present on display 202 a graphical user interface to a user of workstation 101. Furthermore, input device 203 may be used by the user to enter bids and offers, modify them, and to enter into trades involving the interest-rate related instruments.

Server 104 may include processor 211, display 212, input device 213, and memory 214, which may be interconnected. In a preferred embodiment, memory 214 contains a storage device for storing graphical interface information as well as trade information. The storage device further contains a server program for controlling processor 211. Processor 211 uses the server program to transact the purchase and sale of the interest-rate-related instruments. Processor 211 may include graphical interface processor 215 that provides the graphical user interface based on market conditions or other criteria that may relate to the instruments. Processor 211 may include trade processor 216 that executes and processes trades.

Back office clearing center 112 may include processor 221, display 222, input device 223, and memory 224, which may be interconnected. In a preferred embodiment, memory 224 contains a storage device for storing a clearing program for controlling processor 221. Processor 221 uses the clearing program to clear executed trades, thereby facilitating the transfer of securities resulting from the executed trades. Clearing executed trades may preferably include exchanging currency for an instrument.

Figure 3:
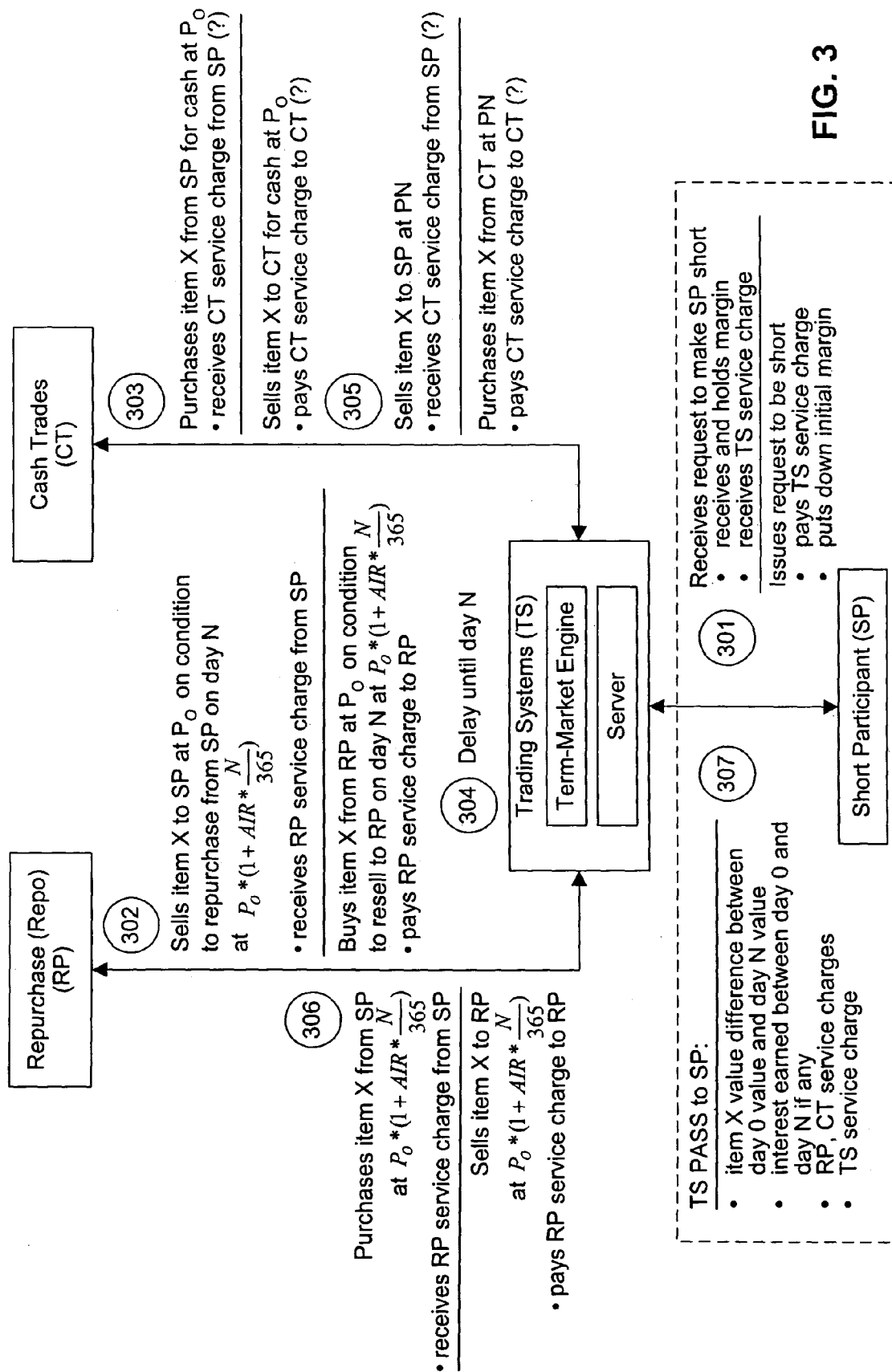
FIG. 3 is a flow chart of a method in accordance with the present invention.

FIG. 3 shows a flow diagram that illustrates a method that may be implemented on a graphical user interface according to the invention. It should be noted that the flow diagram in FIG. 3 deals specifically with a particular type of non-standard settlement—i.e., a short forward sale. Nevertheless, it should be understood that the invention is not limited by this example and, in fact, systems and methods according to the invention apply to any suitable non-standard settlement for a financial instrument.

Step 301 shows a trading system according to the invention which receives a short forward request from a short participant (SP). The request may be the result of user interaction with the interface shown in FIG. 4. In step 301, the trading system preferably receives and holds a margin associated with the short request and may receive a trading system service charge.

Step 302 shows the trading system communicating with the Repurchase (Repo) desk. To fully understand the invention, the following explanation of a Repo desk (at least with respect to government securities, though the same function may still be served with respect to other instruments) is helpful. The Repo desk provides a form of short term borrowing for dealers in government securities. The dealer sells the government securities to investors, and buys the securities back at the original price (minus a service charge associated with the service provided by the Repo desk) as needed. For the party selling the security (and agreeing to repurchase it in the future), it is a repurchase agreement or "repo"; for the party on the other end of the transaction (buying the security and agreeing to sell in the future) it is a reverse repurchase agreement. It should be further noted that the Repo desk may be able to obtain the best available repo rate for the particular instrument because the repo desk is generally knowledgable with respect to the various competitive repo rates in the market. Alternatively, the repo desk may query the market—e.g., with a request for quote—for the most agressive bidder interested in taking part the in the non-standard settlement transaction initiated by the market participant.

With respect to the present invention, the Repo desk provides the cost information associated with the predetermined completion date of the forward contract. In this particular example, the cost information reflects the charge for obtaining and holding the instrument until the execution date of the forward contract. It is appropriate for the Repo desk to be in possession of such information because trading at the Repo desk typically reflects the cost of borrowing a particular security for a particular period of time: the required service in this embodiment of the invention.

As described above, the repo desk provides the cost associated with a forward sale of interest-rate related instrument X at Price ($P_1$) on day N. The cost is generally the traded cash price ($P_0$) of the instrument on day 0 less the price of $$P_o * \left(1 + \text{AIR} * \frac{N}{365}\right)$$

where AIR is the Annual Interest Rate for the particular interest-rate related instrument being used in the non-standard settlement. Thus, the carry cost will be a negative number, representing a positive carry—i.e., the one who carries the item is making, not losing, money—which indicates that $P_0$ is incrementally higher than $P_1$ because of the interest that has been foregone for the time owned by the investor, plus a suitable repurchase charge.

In step 303, in addition to providing cost information, as shown in step 302, the Repo desk also may sell (or hold in escrow) item X to SP at $P_0$ on condition to repurchase from SP on day N at $$P_o * \left(1 + \text{AIR} * \frac{N}{365}\right).$$

The TS purchases item X at $P_0$ from the Repo desk for resale at a later date. Thus, the Repo desk takes a long position in item X for the pendency of the contract. Thereafter, the TS sells item X substantially immediately in the cash market.

Step 304 shows a suitable delay until day N at which the short forward position is covered. The covering of the short position is shown in steps 305-307.

Step 305 shows the trading system, on behalf of the short participant, buying on day N the instrument X in the cash market. An additional suitable cash trades (CT) service charge may be charged to the short forward participant. To close out the position of the short forward participant, the short forward participant will be required to return the purchased item X to the Repo desk or extend—i.e., roll over—his obligation to the Repo desk. Either of these actions may preferably be carried out on his behalf by the trading system.

Thereafter, step 306 shows the trading system passing to the short participant the item X value difference between day 0 and day N reduced by the amount of interest earned (and the concomitant reduction in value of the instrument) between day 0 and day N, if any; and reduced by the repo desk service charge, the cash trade service charge and the trading system service charge.

In the example shown in FIG. 3 the position described is a short forward position, but systems and methods according to the invention apply to both a short and a long forward position, as well as to any other suitable non-standard instrument—as will be further evident from the following. It should be noted as well that one important aspect of the invention is that systems and methods according to the invention preferably utilize tradable components—i.e., components related to standard instruments, to form a contract related to forwards or other non-standard settlements instruments. In an alternative embodiment of the invention, a Repo desk trader may be able to utilize any liquidity provided on such a system of non-standard settlement to participate in trades as the particular needs of his desk or associated positions dictate.

The process of providing the opportunity to establish a non-standard forward position is enhanced by the graphical user interface 400 (GUI) shown in FIG. 4. GUI 400 preferably includes at least two columns 410 and 420. Column 410 shows the instrument that is being offered to the forward participant and the various settlement dates at which the forward participant may choose to settle his forward position. The dates range from one day in the future to 90 days in the future at varying increments. Any suitable date may be implemented in the GUI.

Column 420 shows the various prices for the various dates. The prices are based on the cash price at the top of column 420 and may be extrapolated off of the cash price based on the length of the forward contract, the annual interest rate and current market conditions (typically obtained from the Repo desk). Alternatively, one of the forward positions may reflect actual market conditions and the cash price and the other short positions may be extrapolated from the market conditions for the one short position. Thus, at least in one embodiment of the invention, the prices for the various forward contracts may take advantage of the liquidity of trading of instruments at the cash price.

It should be noted that where only one of a bid or offer is shown in the underlying market, then any extrapolated market will also preferably only be able to show a bid or an offer.

In a preferred embodiment of the invention shown in FIG. 5, the currently traded price 510 may be shown at the top of a screen and then, in response to some input signal—e.g., a click from a mouse—the top of the screen may be expanded to the drop-down menu 520 shown in FIG. 5 (which is the same as the screen shown in FIG. 4). In this way, a minimum of area may be displayed on the screen and the larger portion of the menu adapted for trading the forward contracts may be hidden, yet easily accessible. In one embodiment according to the invention, a tab 530 may be attached at the bottom of the traded price 510. Tab 530 may be used to access the list of forward contracts available to an investor. Though drop-down menu 520 shows a plurality of non-standard settlement positions, it should be noted that the invention describes a drop-down menu with even a single non-standard settlement position.

Figure 6:
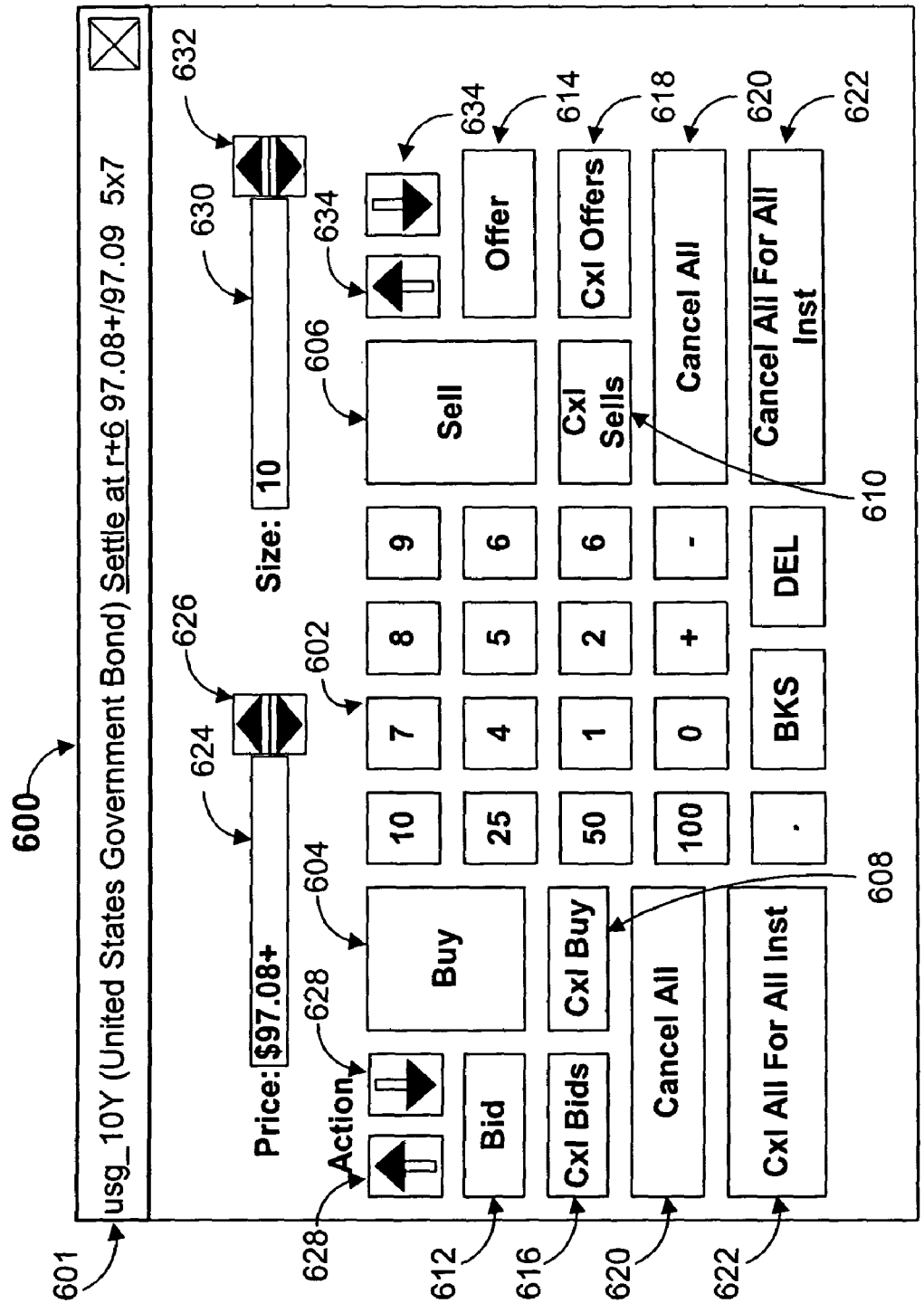
FIG. 6 is a graphical user interface relating to trading an instrument according to the invention.

FIG. 6 shows an interface 600 that may be provided in response to receive an input message such as a mouse click on one—e.g., settle at r+6—of the drop down menu 520 in FIG. 5. Interface 600 shown in FIG. 6 may be presented on a display of user computer 102 of FIG. 1.

In order to submit a bid or offer for the forward instrument indicated in display 601 using interface 600, an investor may first set a bid or offer price and a bid or offer size by entering the appropriate values in fields 624 and 630, respectively, using up/down buttons 626, 628, 632, and/or 634 and/or using keypad 602. Once the desired price and size for the bid or offer have been specified, the trader may then submit the bid or offer by pressing bid button 604 or the offer button 614.

In order to hit a bid or lift (or take) an offer for the instrument indicated in display 601 using interface 600, an investor may first specify a size in field 630 using up/down buttons 632 and/or 634 and/or using keypad 602. Once the desired size has been specified, the trader may then hit the bid or lift (or take) the offer for the specified size by pressing sell button 606 or buy button 604, respectively.

In the event that a trader desires to cancel a bid, an offer, a hit, or a lift (or take), the trader may press any corresponding one of buttons 608, 610, 616, 618, 620 and 622.

Thus, a graphical user interface for providing an investor with opportunities to take non-standard positions with respect to a financial instrument, especially an interest-rate related instrument, is provided.

What is claimed is:

1. A method comprising the steps of:

obtaining by at least one server, from a cash market for a financial instrument, a market price for the financial instrument, wherein the market price comprises an offer price for selling the financial instrument;

obtaining by the at least one server, from a Repurchase desk, a cost of borrowing the financial instrument for a particular duration of time;

determining by the at least one server an offer price for a forward contract for the financial instrument,
wherein the offer price is determined from the cost obtained from the Repurchase desk and from the market price of the financial instrument obtained from the cash market for the financial instrument, and
wherein the forward contract has a settlement date, wherein the settlement date corresponds to the particular duration of time;

communicating by the at least one server, to a workstation in use by a participant, the determined offer price for the forward contract,
wherein communicating the determined offer price for the forward contract to the workstation causes the workstation to display to the participant, via a graphical user interface, the determined offer price, and
wherein the at least one server and the workstation are communicatively coupled via a communications network;

receiving by the at least one server, from the participant, a request to buy the forward contract at the determined offer price;

in response to receiving the request to buy the forward contract at the determined offer price, the at least one server, on behalf of the participant, both:
buying the financial instrument, in the cash market for the financial instrument, at the market price; and
selling to the Repurchase desk the financial instrument at the market price, wherein the sale is made on an obligation that the financial instrument be purchased from the Repurchase desk on the settlement date at the determined offer price;
wherein the participant buys the forward contract without the participant interacting with the Repurchase desk;

wherein the forward contract is a first forward contract; and wherein the method further comprises the steps of:
obtaining by the at least one server, from the Repurchase desk, a second cost of borrowing the financial instrument for a second particular duration of time;
determining by the at least one server an offer price for a second forward contract for the financial instrument,
wherein the offer price for the second forward contract is determined from the second cost obtained from the Repurchase desk and from the market price of the financial instrument obtained from the cash market for the financial instrument, and
wherein the second forward contract has a settlement date different from the settlement date of the first forward contract, wherein the settlement date of the second forward contract corresponds to the second particular duration of time; and
communicating by the at least one server, to the workstation in use by the participant, the determined offer price for the second forward contract,
wherein communicating the determined offer price for the second forward contract to the workstation causes the workstation to display to the participant, via the graphical user interface, the determined offer price for the second forward contract, and
wherein the determined offer price for the second forward contract for the financial instrument is displayed to the participant, via the graphical user interface, together with the determined offer price for the first forward contract for the financial instrument.

2. The method of claim 1, wherein the method further comprises the step of:

communicating by the at least one server, to the workstation in use by the participant, at least one trade price for the financial instrument,
wherein the at least one trade price comprises a next day settlement price,
wherein communicating the at least one trade price to the workstation causes the workstation to display to the participant, via the graphical user interface, the at least one trade price, and
wherein the at least one trade price for the financial instrument is displayed to the participant, via the graphical user interface, together with the determined offer price for the first forward contract for the financial instrument and with the determined offer price for the second forward contract for the financial instrument.

3. The method of claim 2, wherein the method further comprises the step of:

communicating by the at least one server, to the workstation in use by the participant, the market price for the financial instrument, wherein communicating the market price to the workstation causes the workstation to display to the participant, via the graphical user interface, the market price, and
wherein the market price for the financial instrument is displayed to the participant, via the graphical user interface, together with the determined offer price for the first forward contract for the financial instrument, with the determined offer price for the second forward contract for the financial instrument, and with the at least one trade price for the financial instrument.

4. The method of claim 1, wherein the financial instrument comprises an interest-rate related instrument.

5. The method of claim 3, wherein the settlement date of the first forward contract is greater than the next day.

6. The method of claim 1, wherein the financial instrument comprises a fixed income security.

7. The method of claim 1, further comprising the steps of:
at the settlement date of the first forward contract, the at least one server, on behalf of the participant, both:
purchasing, from the Repurchase desk, the financial instrument at the determined offer price of the first forward contract; and
selling, in the cash market for the financial instrument, the financial instrument at a current market price for the financial instrument, the current market price being a market price on the settlement date of the first forward contract.

8. The method of claim 1, further comprising the steps of:
at the settlement date of the first forward contract, the at least one server, on behalf of the participant:
extending, to a new settlement date, the obligation to purchase the financial instrument from the Repurchase desk, thereby rolling over the obligation.

9. A method comprising the steps of:
obtaining by at least one server, from a cash market for a financial instrument, a market price for the financial instrument, wherein the market price comprises a bid price for buying the financial instrument;

obtaining by the at least one server, from a Repurchase desk, a cost of borrowing the financial instrument for a particular duration of time;

determining by the at least one server a bid price for a forward contract for the financial instrument,
wherein the bid price is determined from the cost obtained from the Repurchase desk and from the market price of the financial instrument obtained from the cash market for the financial instrument, and
wherein the forward contract has a settlement date, wherein the settlement date corresponds to the particular duration of time;

communicating by the at least one server, to a workstation in use by a participant, the determined bid price for the forward contract,
wherein communicating the determined bid price for the forward contract to the workstation causes the workstation to display to the participant, via a graphical user interface, the determined bid price, and
wherein the at least one server and the workstation are communicatively coupled via a communications network;

receiving by the at least one server, from the participant, a request to sell the forward contract at the determined bid price;

in response to receiving the request to sell the forward contract at the determined bid price, the at least one server, on behalf of the participant, both:
purchasing from the Repurchase desk the financial instrument at the market price, wherein the purchase is made on an obligation that the financial instrument be sold to the Repurchase desk on the settlement date at the determined bid price; and
selling the financial instrument, in the cash market for the financial instrument, at the market price;
wherein the participant sells the forward contract without the participant interacting with the Repurchase desk;

wherein the forward contract is a first forward contract; and
wherein the method further comprises the steps of:
obtaining by the at least one server, from the Repurchase desk, a second cost of borrowing the financial instrument for a second particular duration of time;
determining by the at least one server a bid price for a second forward contract for the financial instrument,
wherein the bid price for the second forward contract is determined from the second cost obtained from the Repurchase desk and from the market price of the financial instrument obtained from the cash market for the financial instrument, and
wherein the second forward contract has a settlement date different from the settlement date of the first forward contract, wherein the settlement date of the second forward contract corresponds to the second particular duration of time; and
communicating by the at least one server, to the workstation in use by the participant, the determined bid price for the second forward contract,
wherein communicating the determined bid price for the second forward contract to the workstation causes the workstation to display to the participant, via the graphical user interface, the determined bid price for the second forward contract, and
wherein determined the bid price for the second forward contract for the financial instrument is displayed to the participant, via the graphical user interface, together with the determined bid price for the first forward contract for the financial instrument.

10. The method of claim 9, wherein the method further comprises the step of:
communicating by the at least one server, to the workstation in use by the participant, at least one trade price for the financial instrument,
wherein the at least one trade price comprises a next day settlement price,
wherein communicating the at least one trade price to the workstation causes the workstation to display to the participant, via the graphical user interface, the at least one trade price, and
wherein the at least one trade price for the financial instrument is displayed to the participant, via the graphical user interface, together with the determined bid price for the first forward contract for the financial instrument and with the determined bid price for the second forward contract for the financial instrument.

11. The method of claim 10, wherein the method further comprises the step of:
communicating by the at least one server, to the workstation in use by the participant, the market price for the financial instrument,
wherein communicating the market price to the workstation causes the workstation to display to the participant, via the graphical user interface, the market price, and
wherein the market price for the financial instrument is displayed to the participant, via the graphical user interface, together with the determined bid price for the first forward contract for the financial instrument, with the determined bid price for the second forward contract for the financial instrument, and with the at least one trade price for the financial instrument.

12. The method of claim 9, wherein the financial instrument comprises an interest-rate related instrument.

13. The method of claim 11, wherein the settlement date of the forward contract is greater than the next day.

14. The method of claim 9, wherein the financial instrument comprises a fixed income security.

15. The method of claim 9, further comprising the steps of:
at the settlement date of the first forward contract, the at least one server, on behalf of the participant, both:
purchasing, in the cash market for the financial instrument, the financial instrument at a current market price for the financial instrument, the current market price being a market price on the settlement date of the first forward contract; and
selling, to the Repurchase desk, the financial instrument at the determined bid price of the first forward contract.

16. The method of claim 9, further comprising the steps of:
at the settlement date of the first forward contract, the at least one server, on behalf of the participant:
extending, to a new settlement date, the obligation to sell the financial instrument to the Repurchase desk, thereby rolling over the obligation.

* * * * *